United States Patent Office
3,553,300
Patented Jan. 5, 1971

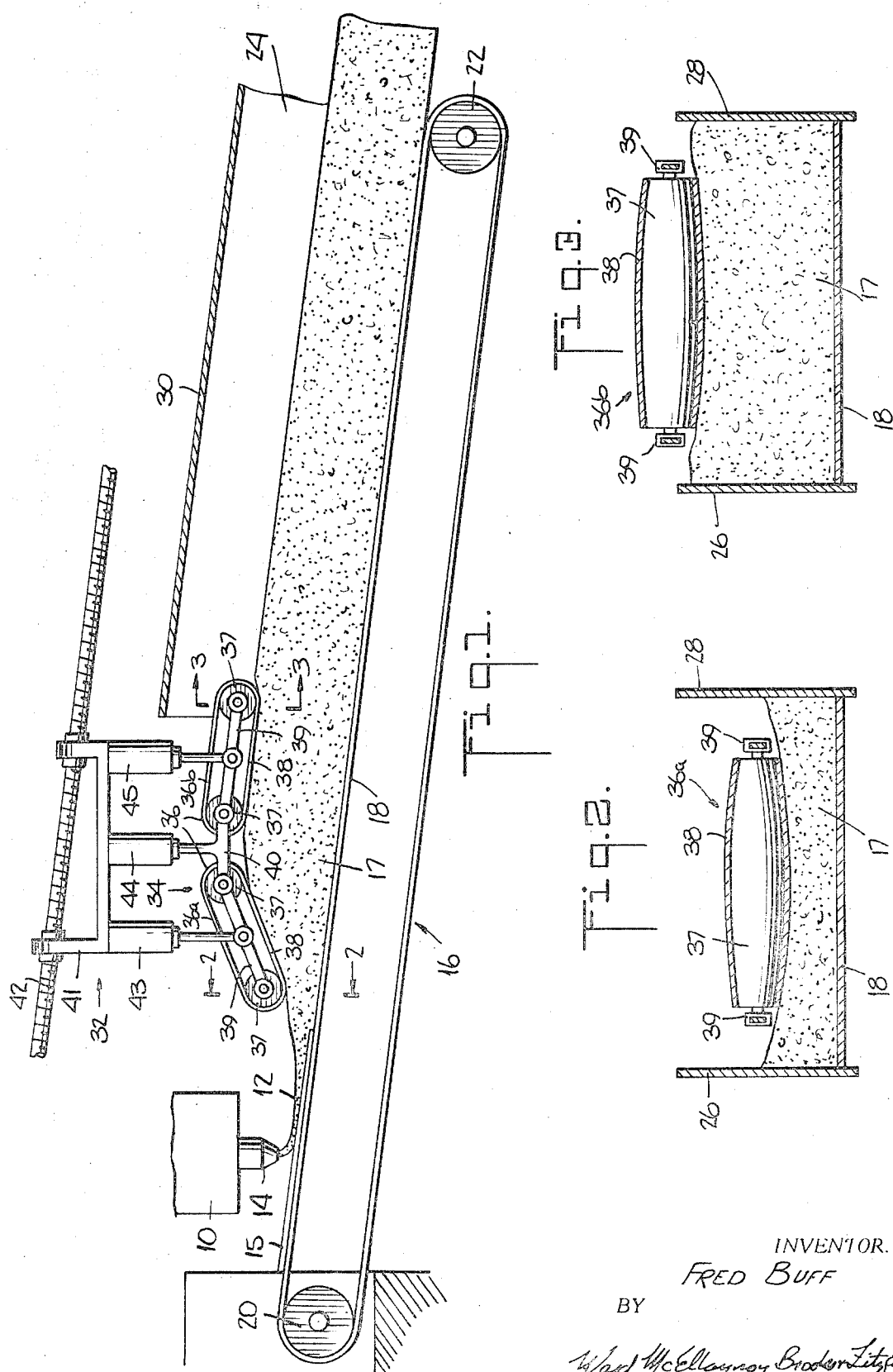

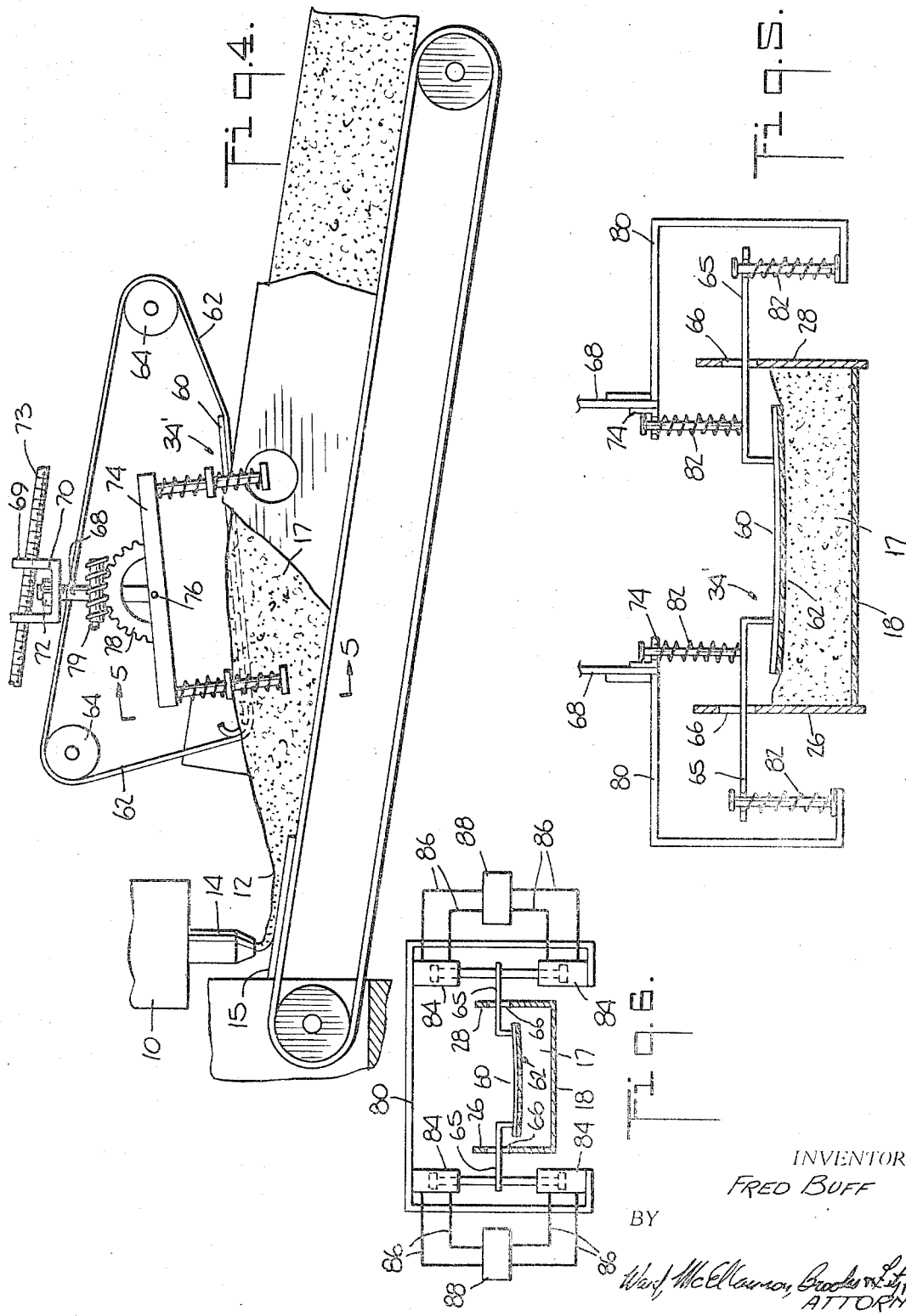

3,553,300
PROCESS FOR CONTROLLING THE UPPER SURFACE CONTOUR OF FOAMABLE POLYURETHANE DURING EXPANSION IN AN OPEN TOP MOLD
Fred Buff, Paramus, N.J., assignor to Tenneco Chemicals, Inc., New York, N.Y., a corporation of Delaware
Filed July 10, 1968, Ser. No. 743,832
Int. Cl. B29d 27/04
U.S. Cl. 264—41    3 Claims

ABSTRACT OF THE DISCLOSURE

A continuous molding process for controlling the upper contour of polyurethane foamed articles including an open topped trough-like conveyor into which a reaction mixture is poured and top pressure means which press down on about the center two thirds of the rising foaming mixture during selected portions of the foam rise process.

---

This invention relates to the molding of foamed products and more particularly it concerns molding arrangements for producing foamed blocks having desired upper contours.

Techniques have been devised for continuously molding foamed articles of polyurethane. The more successful of these techniques involves the depositing of a liquid reaction mixture into one end of a conveyor arrangement of a given cross-sectional configuration and continuously carrying the mixture on the conveyor away from the depositing point while the mixture foams and solidifies into the cross-sectional shape of the conveyor.

For a number of reasons it is desired to leave the upper regions of the conveyor open. That is, the actual conveyor resembles a continuously moving trough in which the reacting mixture is contained. The open top facilitates the construction of the conveyor; and it permits the device to accommodate different deposition rates and different reaction and foam rise rates.

One difficulty which has been experienced in connection with open top conveyors or foam molding devices is that the foam tends to rise higher in the central portions than at the edges. Thus there is inherently produced a top crown. This crown may be as much as 7 inches in the case of a foam slab 40 inches thick. If the finished slab is to be of rectangular cross-section, the crown must later be cut off. In addition to the extra cutting time and machinery required, the crown represents waste material; for most foam forming substances, such as polyurethane, are not amendable to reprocessing.

The present invention overcomes the above described problems. According to the present invention there is provided means for causing the rising foam in an open top molding device to assume a desired upper contour.

The present invention involves the selective application of pressure to the rising foam so that during one portion of the foam rise process, it is forced to undergo a controlled rise pattern which is somewhat inverse to its normal rise pattern. During another portion of the foam rise process, the froce is relieved and the foam is allowed to continue its rise in a more normal manner. The pattern of this latter rise action complements the controlled rise pattern so that the net result is a composite of the two.

In the illustrative embodiments, a flat upper contoured rectangular slab is molded continuously by first applying downward pressure to a central region of the upper foam surface during a portion of the foam rise process so that the foam bulges upwardly along the side regions, and thereafter releasing this pressure so that the foam is allowed to rise more normally during the remainder of the rise process. By properly controlling the amount, location and duration of the central pressure application, a final flat upper contour can be achieved.

According to one aspect of the present invention there is provided a specially suspended pressure applying means which admits of variations in foam rise rates. This pressure applying means comprises a pressure member resiliently biased to a given position but moveable away from that position in response to excessive pressure imposed by the foaming material rising under it. Moreover, means are provided to adjust the angle, height, longitudinal position and contour of the pressure applying means to accommodate the various operating conditions, reaction mixture characteristics and final desired contour which may be involved.

Two specific embodiments of the invention have been chosen for purposes of illustration and description, and are shown in the accompanying drawings forming a part of the specification wherein:

FIG. 1 is a side elevational view showing in longitudinal section, a continuous foam molding apparatus in which the present invention is embodied;

FIG. 2 is a cross-section view taken along line 2—2 of FIG. 1;

FIG. 3 is a cross-section view taken along line 3—3 of FIG. 1;

FIG. 4 is a side elevational view illustrating a modified version of the continuous foam molding apparatus of FIG. 1;

FIG. 5 is a cross-section view taken along line 5—5 of FIG. 4; and

FIG. 6 is a view similar to FIG. 5 showing a further modification.

The foam molding apparatus of FIG. 1 includes a foam machine 10 in which the various reactants may be brought together. For example, in the preparation of a polyurethane foam the hydroxylated polyesters, polyethers, or the like, may be brought together with organic polyisocyanates, catalysts such as amine catalysts and stabilizers for mixing to produce a liquid reaction mixture 12 in foaming head or nozzle 14. The nozzle 14 directs the mixture 12 down onto a pour plate 15. The mixture flows along the pour plate and then passes onto a main conveyor 16 near one end thereof. As the mixture moves along the conveyor 16, it rises as a foam 17. This foam, which eventually solidifies into a cellular product, takes on the general cross-sectional configuration of the structure in which it is contained.

The conveyor 16 includes an elongated belt 18 which extends about two spaced end pulleys 20 and 22. As shown in FIG. 1, the pulleys 20 and 22 are positioned such that the main conveyor 16 passes under the nozzle 14 and extends therefrom in a slightly downwardly inclined direction. Suitable means (not shown) are provided to drive one of the pulleys 20 and 22 so that the upper surface of the belt 18 moves continuously away from the nozzle 14 carrying the freshly poured reaction mixture along with it.

Downstream of the nozzle 14, there is provided an elongated hood 24 which extends along the main conveyor 16. The hood 24 as shown in FIGS. 2 and 3 includes a pair of vertical side plates 26 and 28 which extend along the conveyor 16 extending upwardly from each side of the belt 18, and forming with the belt an open top conveyor. An upper cross plate 30 (FIG. 1) extends between the side plates 26 and 28 to provide a hood effect.

Shortly downstream of the pouring nozzle 14 there is provided a foam rise control arrangement 32. The control arrangement 32 includes a top pressure device 34 which extends over the conveyor 16 and presses down upon the central portion of the upper surface of the rising foam 17. In the arrangement of FIGS. 1-3 the top pressure device 34 comprises a two stage belt conveyor 36. The belt conveyor 36 includes a first or upstream stage 36a and a second or downstream stage 36b, immediately adjacent each other. Each stage includes a pair of belt pulleys 37 about which a belt loop 38 extends. The pulleys 37 of each stage are held displaced from each other by a support arm 39. A sort intermediate arm 40 interconnects the adjacent pulleys 37 of the two stages 36a and 36b.

The belt conveyor 36 is supported from above by means of a frame member 41. This frame member in turn is engaged with a longitudinal screw 42. By turning the screw 42 the longitudinal position of the top pressure device 34 can be adjusted.

First stage, intermediate, and second stage double acting hydraulic piston and cylinder assemblies 43, 44, and 45 are mounted on the frame member 41. The first and second stage assemblies 43 and 45 have their piston rods pivotally connected to the support arms 39 of their respective stages. The intermediate piston and cylinder assembly has its piston rod connected to the intermediate arm 40.

Hydraulic lines and valves (not shown) are provided for controlling the actuation of the various hydraulic piston and cylinder assemblies 43, 44, and 45. It will be appreciated that by extending or retracting each of the assemblies in unison, the height of the entire top pressure device 34 can be adjusted. On the other hand by actuating the first and second stage assemblies 43 and 45 in opposite directions without actuating the intermediate assembly 44, the overall longitudinal tilt of the top pressure device 34 can be adjusted. Further, by selective control of any one or more of the various piston and cylinder assemblies, the overall longitudinal contour of the top pressure assembly 34 can be adjusted.

It will, of course, be understood that additional belt conveyor stages could be used for more flexible and closer control of longitudinal contour.

As shown in FIGS. 2 and 3, the width of the top pressure device 34 is about two-thirds the width of the main conveyor 16; and it is centered transversely of the conveyor. Thus, for example, where the main conveyor 16 is 80 inches wide, the top pressure device 34 would have a width of about 50 inches. Also as shown in FIGS. 2 and 3 the configuration of the top pressure device 34 may be convex in cross section, that is, it is bowed outwardly toward the center thereof. This central bowing provides a top pressure applying configuration which is generally inverse to that of the normal rise pattern of the foam 17.

The belt loops 38 of the conveyor 36 may be of Teflon, or other material which will not adhere to the tacky rising foam 17.

As shown in FIG. 1, the tilt angle, height, contour, and longitudinal position of the top pressure device 34 are adjusted such that it presses down in the center of the rising foam 17 in different degrees as the foam moves along the main conveyor 16. The amount of pressure thus exerted can be controlled so that, as shown in FIGS. 2 and 3, the central portion of the rising foam 17 will initially move up against the bottom of the device 34 and will then flow laterally toward the non-pressurized sides of the main conveyor 16. Thereafter, since the top pressure device 34 rises faster than the foam 17, the central portions of the foam will be allowed to rise at a normal rate. It can be seen that the device initially imposes a resistance to foam rise according to a pattern which is just the inverse of the pattern of natural foam rise (i.e., high in the center and lower at the edges). However, this resistance is imposed only during the initial portion of the foam rise so that during the remaining portion the natural rise pattern will balance the effects of the device and a substantially flat upper foamed surface is produced as shown in FIG. 3.

FIGS. 4 and 5 show a system similar to that described in conjunction with FIGS. 1-3. However, the arrangement of FIGS. 4 and 5 utilizes a top pressure device 34' which is of somewhat different construction. As in the preceding arrangement there is provided a foam machine 10 which provides a liquid reaction mixture 12 and distributes it via a nozzle 14 onto one end of a main conveyor 16.

The top pressure device 34' produces the same function as the top pressure device 34 of FIGS. 1-3. However, it is of a somewhat different construction. As shown in FIG. 4 there is provided an expansive, generally flat rigid backing member 60 under which a web 62 of release paper or similar release material passes. The web 62 may be continuous, and in such case, it passes over a pair of spacer rollers 64. Also, as shown in FIG. 5, the backing member is bowed downwardly in the transverse plane in the same manner and for the same purpose as the belt 36 of the top pressure device 34 of FIGS. 1-3.

The backing member 60 is secured to a pair of laterally extending support plates 65 which extend through openings 66 in the side plates 26 and 28. A pair of threaded suspension rods 68 extend down from an adjustment yoke 70 and may be adjusted to any height by means of adjustment nuts 72 mounted on the yoke 70. The yoke 70 is itself mounted for longitudinal movement along rotatable threaded shafts 73. A pair of pivot arms 74 are fixed by means of central pivots 76 to the bottom of the suspension rods 68; and adjustment sectors 78 are provided to allow tilting of the device upon rotation of a worm screw 79. Frame members 80 are secured to the pivot arms 74. The support plates 64, together with the backing member 60, are connected to the frame members 80 via upper and lower centering springs 82. Guide rods are provided on the frame 80 and these pass through openings in the support plates 64 to provide lateral support.

In the arrangement of FIGS. 4 and 5 the top pressure device 34' can be adjusted to any desired tilt and height. However it has the additional advantage that since it is spring suspended, it will accommodate variations in the rate of foam rise. Moreover, it will be noted that the actual spring supported weight may be reduced to a minimum so that the device will more readily accommodate these variations.

FIG. 6 shows an arrangement which is similar in operation to that of FIGS. 4 and 5. However the arrangement of FIG. 6 utilizes hydraulic piston and cylinder assemblies 84 in place of the springs 82 of FIGS. 4 and 5 in order to maintain proper positioning of the top pressure device 34'. Hydraulic lines 86 connect the piston and cylinder assemblies to suitable valve mechanism 88 which may be controlled to provide any desired pressure response to the action of the rising foam.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. A method of molding foamed products in an open topped container to a given upper contour, said method comprising the steps of depositing a foamable liquid polyurethane reaction mixture into an open topped molding conveyor and applying downwardly directed pressure to about the center two thirds of the reaction mixture thereby to resist the upward movement of the upper surface of the rising foam during a first portion of the foam rise interval while allowing unrestricted rise of said upper surface in regions outside the center two thirds and adjacent the sidewalls during the same first portion of the foam rise interval, and during a subsequent portion of the foam rise interval, allowing unrestricted rise of the entire upper surface of the rising foam.

2. A method as in claim 1 wherein said pressure is applied in a pattern which is generally inverse to the pattern of normal foam rise.

3. A method as in claim 1 wherein said liquid polyurethane reaction mixture is deposited continuously into one end of a molding conveyor and the conveyor is caused to pass under a top pressure member which member applies pressure to about the center two-thirds of the reaction mixture in the conveyor during one portion of the foam rise process and said reaction mixture is free of the top pressure member during a later portion of the foam rise process.

References Cited

UNITED STATES PATENTS 3,354,503  11/1967  Joseph et al. _____ 264—54X
3,240,846  3/1966  Voelker _____ 264—47

JULIUS FROME, Primary Examiner

P. A. LEIPOLD, Assistant Examiner

U.S. Cl. X.R.

18—4; 264—48, 54